United States Patent [19]
Killian et al.

[11] Patent Number: 5,558,785
[45] Date of Patent: Sep. 24, 1996

[54] INTER-ELECTRODE DISPLACEMENT MONITORING AND CONTROL

[75] Inventors: Michael L. Killian, Troy; Michael D. Orr, Commerce Township, both of Mich.

[73] Assignee: Eaton Corporation, Cleveland, Ohio

[21] Appl. No.: 362,391

[22] Filed: Dec. 22, 1994

Related U.S. Application Data

[63] Continuation-in-part of Ser. No. 224,899, Apr. 8, 1994, Pat. No. 5,393,950.

[51] Int. Cl.⁶ .................................................. B23K 11/25
[52] U.S. Cl. ............................................................. 219/110
[58] Field of Search .................................. 219/109, 110, 219/117.1

[56] References Cited

U.S. PATENT DOCUMENTS

| | | | |
|---|---|---|---|
| 3,400,242 | 9/1968 | Waller | 219/110 |
| 3,404,252 | 10/1968 | Michael | 219/110 |
| 3,708,648 | 1/1973 | Croucher et al. | 219/109 |
| 4,296,304 | 10/1981 | Defourny | 219/86.41 |
| 4,419,558 | 12/1983 | Stiebel | 219/109 |
| 4,441,006 | 4/1984 | Machida et al. | 219/85 |
| 4,447,700 | 5/1984 | Cohen | 219/117.1 |
| 4,449,029 | 5/1984 | Nied | 219/117.1 |
| 4,461,944 | 7/1984 | Cohen | 219/110 |
| 4,596,917 | 6/1986 | Nied et al. | 219/109 |
| 4,684,778 | 8/1987 | Cecil | 219/89 |
| 4,714,913 | 12/1987 | Cohen | 340/347 |
| 4,734,555 | 3/1988 | Ferguson | 219/109 |
| 4,803,331 | 2/1989 | Cohen | 219/108 |
| 4,861,959 | 8/1989 | Cecil | 219/89 |

FOREIGN PATENT DOCUMENTS 9401236  1/1994  WIPO.

Primary Examiner—Clifford C. Shaw
Attorney, Agent, or Firm—Jennifer M. Stec

[57] ABSTRACT

An electrode displacement monitoring and control system for predicting and adaptively controlling resistance weld quality. The relative displacement (34) between a movable electrode (16) and a fixed electrode (20) is monitored during a resistance weld cycle. The displacement information is processed and applied as a control signal for dynamically and adaptively varying various weld parameters including current application in order to control weld quality. A reversal in the direction of electrode displacement is identified and used in the adaptive control strategy to determine the amount of dynamic indentation achieved in a weld cycle.

15 Claims, 4 Drawing Sheets

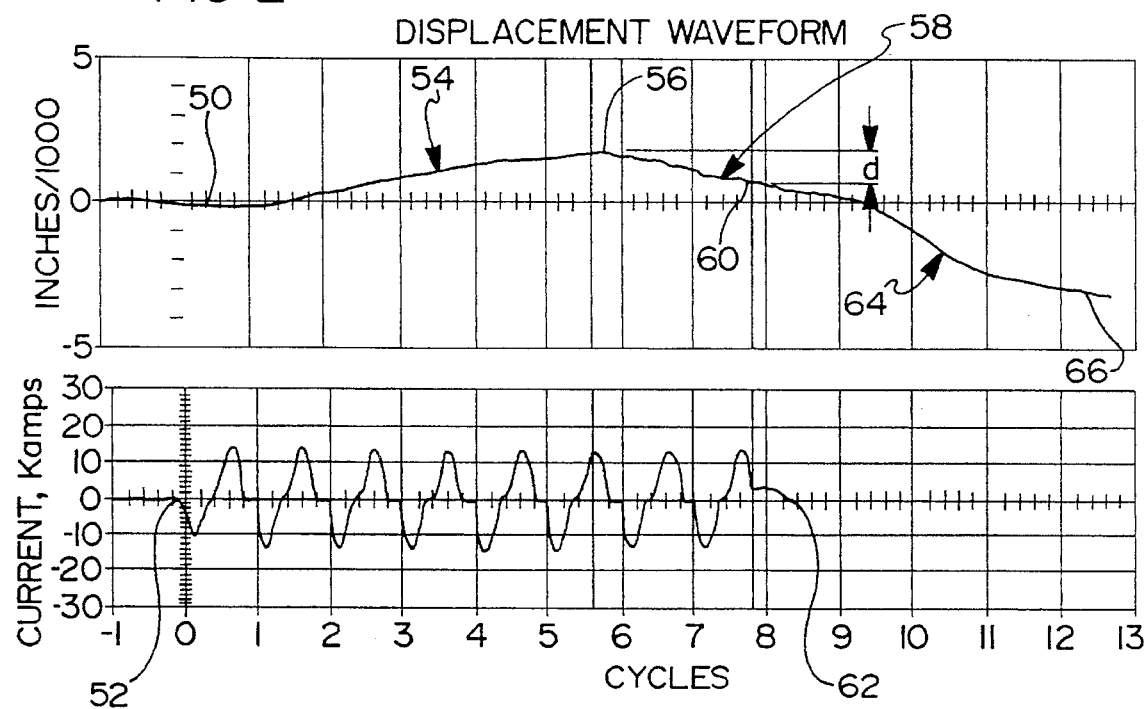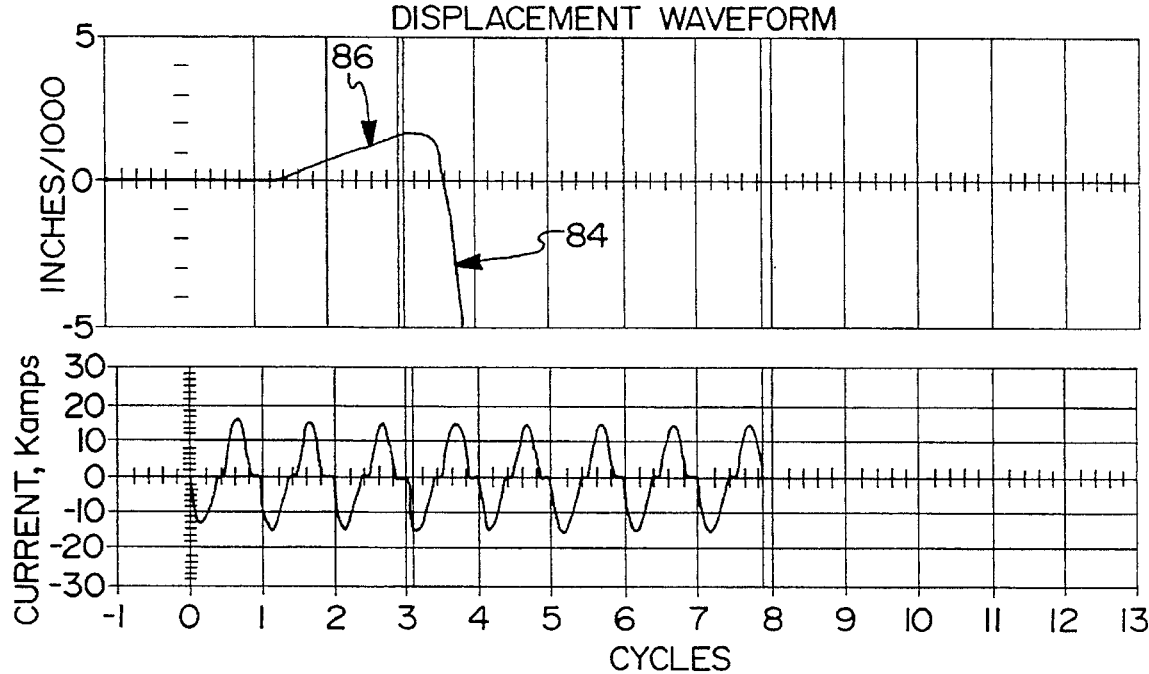

5,558,785

INTER-ELECTRODE DISPLACEMENT MONITORING AND CONTROL

CROSS-REFERENCE TO RELATED APPLICATION

This application is a continuation-in-part of U.S. application Ser. No. 08/224,899, filed Apr. 08, 1994 and assigned to the assignee of the present invention, now U.S. Pat. No. 5,393,950.

BACKGROUND OF THE INVENTION

This invention relates generally to resistance welding systems and, more particularly, to a system and method of predicting and adaptively controlling resistance weld quality by monitoring the relative displacement between a pair of electrodes.

In a typical resistance welding application, and in particular a resistance spot welding application, metallic workpieces are positioned in an overlapping relationship between a pair of axially opposing electrodes. One electrode is substantially fixed in position and the other electrode is movable toward the fixed electrode. To effect welding, the movable electrode is moved toward the fixed electrode, squeezing or compressing the workpieces therebetween. An electrical current is then passed between the electrodes, and the resistance of the workpiece material is used to melt a localized area in each of the workpieces. When the current is interrupted the molten metal solidifies, thereby fusing the workpieces together.

However, because these processes generally involve relatively high temperatures, occur over a short period of time and involve very small displacements, the development of process monitoring and control systems and methods in such applications has thus been hindered. It has therefore been difficult to adequately ensure good resultant weld quality in this type of application, especially in high speed automated resistance welding processes. Although there have been numerous attempts at performing this function, none have in practice adequately ensured the consistent production of high quality welds.

SUMMARY OF THE INVENTION

The present invention addresses this problem by providing an inter-electrode displacement monitoring method and control system. The changing relative distance between the movable electrode and the fixed electrode is monitored during the course of a resistance welding process. This displacement information is processed and applied as a control signal for anticipating weld quality as well as for adaptively and dynamically varying the applied weld current and/or other weld parameters in order to obtain a good quality weld.

More specifically, the relative displacement of the movable electrode with respect to the fixed electrode, as well as the rate of change of this displacement, is monitored and controlled by varying the applied weld current. In addition, a reversal in the direction of electrode displacement is identified. The time into the weld cycle at which this reversal occurs, as well as the indentation occurring from the point of reversal until weld current is interrupted (the "dynamic indentation"), is used to predict resultant weld quality and to adaptively control the weld process to provide an optimum amount of indentation of the electrodes into the workpiece which thereby leads to the production of a strong weld. It also enables the dynamic variation of applied weld current in order to predict and prevent expulsion as well as to produce quality edge welds.

These and other advantages and features of the present invention will become apparent from the following description taken in conjunction with the accompanying drawings.

BRIEF DESCRIPTION OF THE DRAWINGS

FIG. 2 is a graphical representation illustrating the monitored inter-electrode displacement and applied current during a successful welding cycle.

FIG. 3 is a graphical representation similar to FIG. 2 illustrating the inter-electrode displacement and current during an expulsion.

DETAILED DESCRIPTION OF THE PREFERRED EMBODIMENT

Figure 1:
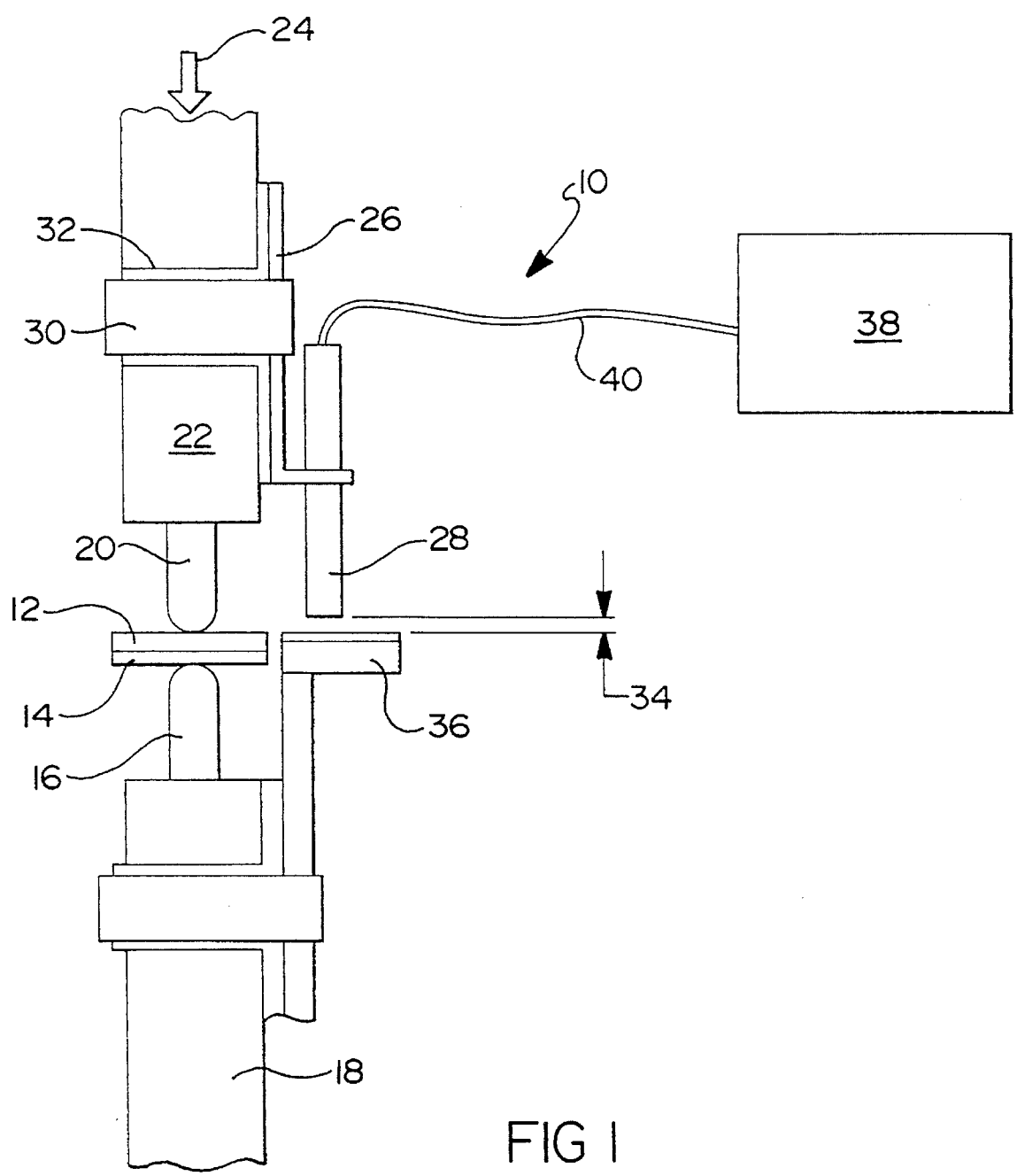
FIG. 1 is a schematic diagram of the monitoring and control system of the present invention, as implemented in a typical resistance spot welding application.

Turning now to the drawings, and in particular to FIG. 1, a resistance welding system equipped with the displacement monitoring and control system of the present invention is indicated generally at 10. As shown therein, a pair of workpieces 12 and 14 are fixtured in an overlapping relationship above a rigid or fixed position electrode 16 which is held in a fixed electrode holder 18. A movable electrode 20 is positioned axially opposite fixed electrode 16 in an electrode holder 22, the electrode 20 and holder 22 being movable toward fixed electrode 16 via a force such as that provided by an air cylinder 24.

Using an appropriately fashioned mounting device such as a bracket 26, a sensor 28 is rigidly affixed to movable electrode 20 or movable electrode holder 22, such as by a surrounding bracket 30. In order to electrically insulate the sensor 28 from the intense electricity utilized in the welding operation, a suitably fashioned nonconductive insulator 32 may also be positioned between holder 22 and bracket 26. In the presently preferred embodiment, sensor 28 is a non-contact photo-optic sensor, but sensor 28 may alternately be any other appropriate laser-based or other type of sensor adapted to measure the instantaneous relative distance 34 from itself to a predefined target 36. This type of sensor provides a significant advantage over other sensor types, such as those employing eddy currents, in that electromagnetic interference created by the welder in the sensor output is kept to a minimum.

Sensor 28 is preferably positioned with respect to electrode 20 or holder 22 so as to obtain displacement measurement with respect to target 36 which is attached to fixed electrode 16 or its holder 18 in a manner similar to that by which sensor 28 is attached to movable electrode holder 22. The distance 34 represents the relative displacement of movable electrode holder 22, and therefore movable electrode 20, relative to fixed electrode 16. In contrast to the electrode-to-workpiece displacement measurements discussed in the above mentioned related application, this inter-electrode displacement 34 additionally accounts for the indentation of fixed electrode 16 into the surface of the lower workpiece 14. Similarly, melting or "mushrooming" of the tip of electrode 16 is also reflected in the inter-electrode displacement measurements thereby providing a more comprehensive dynamic indentation measurement.

Sensor 28 is preferably adapted to produce a continuing series of discrete output signals, each being indicative of the instantaneous relative displacement 34 between the fixed and movable electrodes. These signals are preferably output to a signal processor 38 via an output line 40. Processor 38 is preferably a microprocessor-based device which can also display these values or is otherwise connected to a suitable display device. Processor 38 is also preferably electrically connected to, or resident in, the controller utilized to control the movement of electrode 20 as well as the application of weld current thereto (not shown).

A resistance spot weld made on this type of system generally begins with the application of a "pre-squeeze" or "squeeze" force. Air pressure from cylinder 24 acts upon a piston rod attached to electrode holder 22 and drives movable electrode 20 against upper workpiece 12. Electrode 16, being rigidly mounted, serves as a backstop for workpiece 14. With the pre-squeeze or squeeze force applied, the initial electrode displacement 34 is indicative of the electrode wear and/or workpiece thickness.

Upon completion of the squeeze cycle, welding current impulses are applied while the force from air cylinder 24 is maintained. Typically, weld current is applied for two to fifty cycles of sixty cycle alternating current, each half-cycle generally being individually controllable. As the welding current is applied, the interfaces between electrodes 16 and 20 and workpieces 12 and 14, are resistance heated. Heating at these interfaces generally results in thermal expansion of workpieces 12 and 14, as well as of electrodes 16 and 20 and electrode holders 18 and 22. The electrodes and holders, however, are typically water cooled and therefore may not contribute much to the total amount of expansion in comparison to the expansion of the workpieces. During this early part of the welding cycle, the initial hardness of the workpiece material generally prevents any indentation by the electrodes 16 and 20 into the workpiece material.

From the application of the initial weld current half-cycles, expansion occurs, moving electrode 20 against and in a direction opposite to the weld force applied by cylinder 24. This therefore results in an increasing relative distance or inter-electrode displacement 34 between movable electrode 20 and fixed electrode 16. Preferably, this expansion phase of the interelectrode movement lasts from the first current half-cycle to about one-third or two-thirds of the total number of current half-cycles and is generally more pronounced in resistance welding bare or uncoated materials.

At some point in this process, the material at the overlapping or faying surfaces of workpieces 12 and 14 begins to melt. Melting progresses as additional material in the surrounding general vicinity of the newly forming nugget continues to rise in temperature. On a microscopic scale, there is both expansion and contraction due to changes of state and phase in the workpiece material. Also, as temperature continues to increase, the hardness and strength of the workpiece material diminishes and indentation of electrodes 16 and 20 into the outer surfaces of workpieces 12 and 14 is made easier.

A significant net effect which occurs at some point while applying weld current is a reversal in the inter-electrode movement and therefore a subsequent decrease in the amount of relative displacement 34. At this time the expansion phase halts and electrode 20 ceases to move in a direction opposite to the force applied by air cylinder 24. Expansion forces from the workpieces, weld zone, electrodes and holders seem balanced against air cylinder weld force. Generally, however, this period of electrode reversal is short-lived, typically lasting only about one to four half-cycles.

Following electrode movement reversal, with current still being applied, movable electrode 20 moves toward fixed electrode 16, thereby resulting in a progressively decreasing inter-electrode distance 34. This electrode movement in the direction of the applied cylinder force is primarily due to the electrodes indenting the workpiece surfaces. As this indentation continues, there is a progressively smaller inter-electrode distance 34. For most welds, the inter-electrode displacement distance continues to decrease until the weld current is interrupted. During a subsequent "hold" period prior to release of the workpiece by the movable electrode, the weldment cools and the electrode displacement continues to decrease as the weldment contracts. During this time, there is both electrode indentation and workpiece contraction.

This changing displacement 34 is best illustrated with reference to the graph shown in FIG. 2, the data plotted in FIG. 2 being obtained with the weld system illustrated in FIG. 1 on bare uncoated steel. In this figure, displacement 34 is plotted with respect to time on the upper plot and the concurrently applied current is shown below. The weld cycle begins at point 50 with the application of the first current half cycle at 52. As current is applied, the expansion phase begins, as shown along displacement curve portion 54.

The expansion phase continues until point 56, at which time reversal in the direction of movement of electrode 20 occurs, in this example approximately 12 half-cycles or six full cycles into current application. The point at which this reversal occurs can be determined mathematically by processor 38 as the point at which the slope of an imaginary line connecting contiguous instantaneous measured displacement values equals zero, or that point at which the slope changes in sign from positive to negative.

After reversal, a downward slope in curve 58 continues until point 60, at which time the applied weld current is interrupted at 62. During this phase the movable electrode 20 moves toward the fixed electrode, thus resulting in a decreasing electrode displacement d, which can be referred to as the "dynamic indentation". After weld current ceases, the displacement decrease continues along curve 64, as indentation of the electrodes into the workpieces and concurrent metal contraction usually continues for some time after the current is removed. The displacement eventually reaches a near constant level 66 as the workpiece material hardens. As shown in the figure, the amount of "dynamic indentation" d, which specifically excludes indentation occurring after the interruption of electrical current, constitutes a relatively small portion of the total amount of indentation. However, the "dynamic indentation" portion occurs during the application of current and therefore is directly controllable, unlike post weld indentation which occurs after the application of current has been interrupted and which is partially due to contraction of the solidifying metal and other such factors.

The amount of dynamic indentation is a key parameter in assessing the quality of the resultant weld. Too little indentation can suggest that the workpieces were not sufficiently melted to create a strong weld nugget. Too much indentation can indicate an expulsion wherein excess molten metal has been expelled outwardly from the weld site, thereby causing a decreased amount of metal to be joined in the weld.

The signal output by sensor 28 displayed in this fashion thus provides a weld displacement profile or "signature". These signatures can then be correlated with the results of destructive weld strength tests and other indications of weld quality. Analysis of this signature, and of the inter-electrode displacement at certain key points, as well as the rate of change of the measured displacement values, can then be used to analyze the weld process and to accurately predict and control resultant weld quality. The sensed "reversal" in electrode movement is found to be a key feature in assessing spot weld quality, particularly on bare or uncoated steel in that it provides a starting point for the measurement of dynamic indentation. Electrode movement reversal, in addition to a certain amount of continuing movement of the electrode toward the workpiece generally assures that a good quality weld has been deposited. Sensing of the point at which the slope of the displacement curve approaches zero, as well as the rate of change of the instantaneous displacement values and the magnitude of the dynamic indentation, thus allows for a number of monitoring and control strategies in accordance with this invention.

A first monitoring and control strategy of this invention involves selecting a predetermined weld time or number of weld cycles, and then adaptively modulating the weld current to force a specific electrode displacement profile or signature, preferably within certain specified limits. However, the desired profile tends to be very application specific and depends greatly on the materials used, metal thickness and other related parameters. Therefore, the target displacement profile to be achieved for a given application is preferably determined empirically, by gathering and comparing profiles for welds found by physical testing to have both good and poor quality. However, knowledge gained from repeated use of this method can also be used to define a target displacement signature for a given application.

In addition to electrode movement reversal and the subsequent electrode indentation, the displacement profile can be subdivided to include expansion and dynamic indentation regulation to further ensure that a good weld is obtained in the fixed weld time period. With this level of control, the desired displacement profile is detailed on a one cycle or half-cycle basis. For example, an operator may select a ten cycle weld having an expansion phase lasting six cycles. One cycle for the electrode movement reversal is then allocated, with the additional three cycles for electrode indentation. Specific quantitative ranges of displacement values may also be determined.

During the weld, sensor 28 continually provides displacement data to the controller. If expansion, as compared to a target expansion, is excessive after two cycles, the controller retards the firing angle to provide less current and reduce heating. If electrode movement reversal is not achieved in seven cycles, fourteen half-cycles, the current is increased on the fifteenth half-cycle to provide a correction. As necessary, the current may be driven even higher to force electrode movement reversal and subsequent dynamic indentation during successive cycles. If a pre-programmed dynamic indentation is not reached or, in the worse case scenario, if the reversal of the electrode movement is not achieved, the controller may then activate indicator lamps appropriately indicative of the fault.

Utilizing sensor 28 for measuring electrode displacement also enables the detection of expulsion and can be used to avoid expulsion, an undesirable spatter of molten metal most often caused by an excessively high current. An example of a displacement signature obtained on a bare steel weld during an expulsion is indicated in FIG. 3. As shown clearly therein, an expulsion can be identified by a sudden, near-vertical plummet 84 in the displacement signature graph, in the direction opposite to that of expansion. However, expulsion is often preceded by an excessive rate of expansion, shown in the figure as curve segment 86. If the expansion profile is well defined, the controller will be able to interpret an excessive expansion rate as undesirable and adjust the current downward to prevent expulsion. This can be done by defining a desired or target slope for the expansion curve, as well as an amount of allowed deviation therefrom, and comparing the measured displacement slope to the target slope. However, if expulsion occurs unexpectedly or despite adjustments by the controller, it can be detected via the detection of a particularly large dynamic or overall indentation or a near vertical slope in the displacement curve subsequent to reversal. Also, the starting current for the next weld can thereafter be decreased until a satisfactory expansion rate is measured and good welds are produced.

Figure 4:
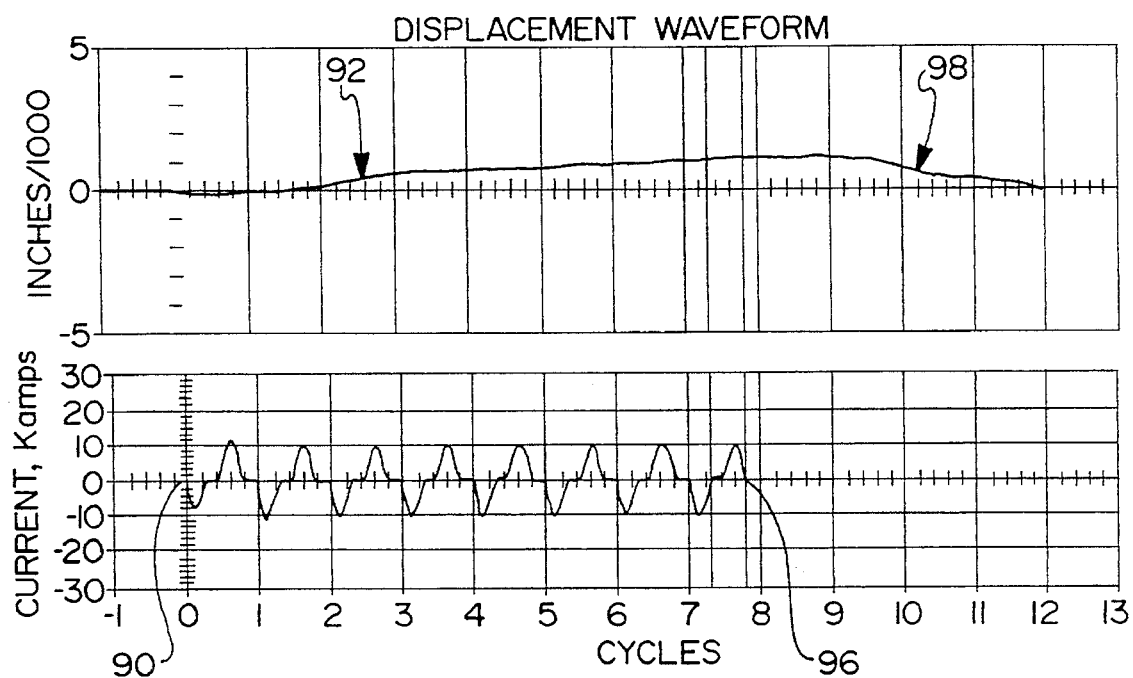
FIG. 4 is a graphical representation similar to FIGS. 2 and 3 illustrating inter-electrode displacement occurring during a weld cycle which produced a weld of insufficient strength.

Similarly, the displacement profile for a weld found to have an insufficient weld strength is shown in FIG. 4. As shown therein, the first half cycle of current is applied at 90 thereby initiating expansion phase 92. Reversal at point 94 is followed closely by the interruption of current at 96, resulting in a comparatively small amount of dynamic indentation d. This dynamic indentation is then followed by an also comparatively smaller amount of post weld indentation along curve 98.

Figure 5:
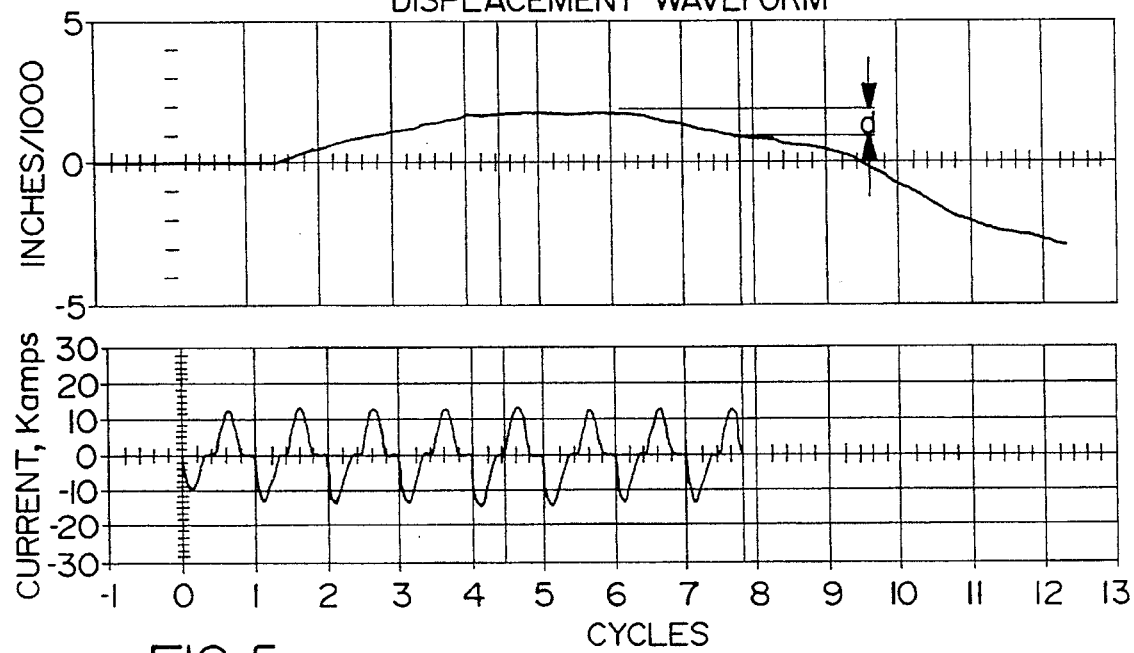
FIG. 5 further illustrates inter-electrode displacement and applied current in the production of a good quality weld.

Contrasting the displacement curve shown in FIG. 4 to those in which a good quality weld was produced, more specifically FIGS. 2 and 5, several distinct differences in these curves become apparent. The most notable and important difference is the lack of any dynamic indentation in the production of the poor quality weld. This, in turn, leads to a small overall indentation of the electrodes into the workpiece surfaces. Additionally, it is readily apparent that no real reversal occurred. Also, the slope of expansion curve 92 is more gradual than those created when making the high quality welds indicated by the weld signatures shown in FIGS. 2 and 5.

Figure 6:
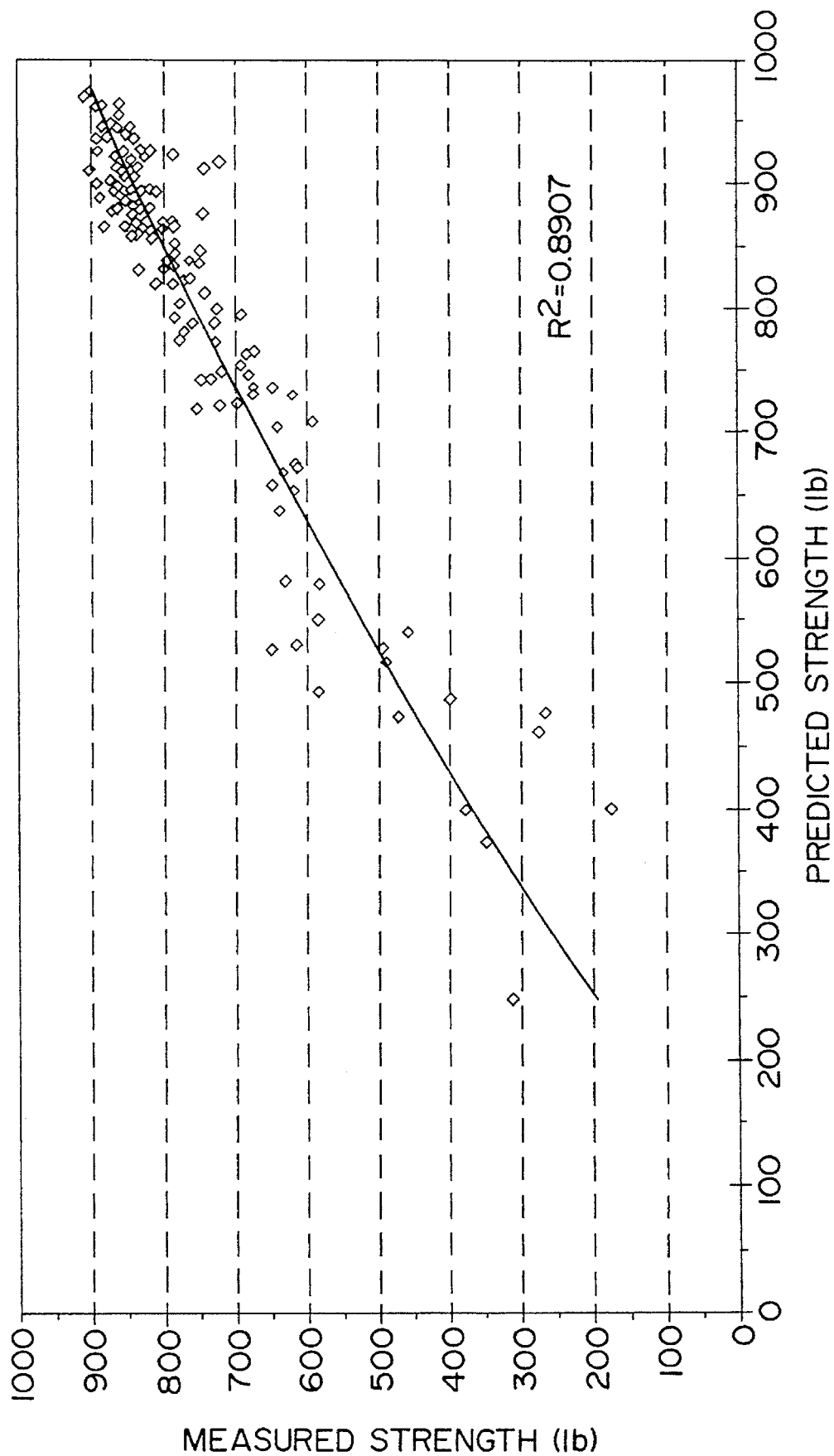
FIG. 6 is a graph comparing weld strength as predicted using the method of the present invention to measured strength.

Thus, by monitoring displacement carefully, especially in the first half of the weld cycle, resultant weld quality can be predicted even before the weld is completed. FIG. 6 illustrates a comparison of predicted to actual weld strength in samples tested with the method of the present invention. More importantly, if the displacement curve deviates from a curve found to be indicative of a good quality weld and this deviation is discovered early in the weld cycle, the magnitude of applied current can be controlled in the remainder of the cycle to force a good weld. In addition, the current in the next weld can also be adaptively controlled, based on the displacement measured in the previous weld(s), to at least ensure that subsequent welds are of good quality.

In this regard, another possible control strategy enabled by the system and method of the present invention is a constant current, variable time weld control method. Using this approach, the weld controller delivers a constant current in the secondary by means of data from a pickup coil such as an air toroid. Displacement sensor 28 monitors the changing electrode displacement. The constant weld current output is maintained until a set period of time after displacement sensor 28 detects the reversal of electrode movement from expansion to indentation. Highest weld strengths are obtained when the current is not terminated immediately upon the reversal of the electrode movement but is maintained for several cycles after reversal. These additional current cycles promote electrode indentation into the workpiece surfaces. For a fifteen to twenty cycle weld schedule, the electrode indentation period, following electrode movement reversal, preferably lasts from six to ten cycles.

Because "mushrooming" of the electrode tips can extend the time to reversal of the electrode movement, it is also necessary to establish "windows" or permissible thresholds in time during which the weld must be accomplished. For example, in a fifteen cycle weld, if the reversal in electrode movement is not reached in ten cycles, then the welding current is terminated and the controller activates an appropriate fault lamp. For the same weld schedule, if electrode movement reversal is detected only after three cycles, the welding current is terminated and a fault lamp is likewise activated. While the best results have been obtained with weld controllers regulating current in the secondary, other controllers with primary current regulation, power factor regulation or automatic voltage compensation can be used successfully with the electrode displacement variable time method.

Alternately, yet another control strategy may be used in conjunction with the displacement monitoring system and method of the present invention. Like the variable time method described above, this dynamic indentation method is based on the detection of the reversal of the electrode movement. Since highest weld strengths are obtained if the current is not terminated immediately upon the electrode movement reversal, this indentation specific method maintains the welding current following electrode movement reversal, until the sensor and controller detect a pre-programmed amount of dynamic indentation during the weld. In this instance, the dynamic indentation is determined as the electrode displacement measured from the point of reversal during the application of the current pulse. However, this relates only to the "dynamic" or directly controllable indentation occurring during the application of weld current and additional indentation and contraction usually occur after the weld current is interrupted and should be taken into account. Similar to the variable time method described above, windows or thresholds can be established so that the electrode movement reversal and the specified dynamic indentation are obtained in predefined time ranges.

A further approach involves maintaining weld current until electrode movement reversal and the subsequent electrode indentation phases have been completed. Welding current is terminated only after a specific number of cycles following a minimum sensed dynamic indentation or after a second electrode movement reversal. Yet another alternative approach involves maintaining a constant weld current until electrode movement reversal and the indentation phases have been completed and until a specific second expansion has been obtained.

In order to deal with more difficult weld conditions under any of the aforementioned control strategies, certain adjustments to the system and processes discussed above are possible. For instance, coated materials such as hot dipped galvanized steel and electro-galvanized steel which have an outermost layer consisting of a low melting temperature material can be resistance spot welded. However, it must be kept in mind that when welding some coated materials the coating may expand, melt or vaporize away early in the welding cycle, typically before the base material completes the initial expansion phase. As the coating material rises in temperature, a small expansion peak can sometimes occur followed by a small reversal in electrode movement. The easiest way to prevent this small signal from triggering an undesirable response from the controller is to ignore the signals early in the weld cycle, for instance the first five cycles in a sixteen cycle weld on a coated material could be ignored.

Similarly, edge welds may also present problems since their proximity to the edge of the workpiece limits the amount of thermal mass or heat sink available and the fitup at the edge is usually poor, thereby providing opportunities for the molten metal to escape from the workpiece interfaces in a manner similar to an expulsion. The corrective action required to prevent expulsion from occurring during an edge weld is to significantly reduce the welding current. In the present control strategy, if the present displacement sensor is used to monitor the expansion rate, an edge weld condition should be detected after a few half-cycles of current. The expansion rate for the edge weld, i.e. the slope of the expansion curve, will be unusually high. With a variable current system, the controller will reduce the weld current substantially as soon as the high expansion rate is detected. This type of action may significantly reduce or prevent expulsion.

The present invention thus enables the prediction and control of resistance spot weld quality in a relatively simple and cost efficient manner not heretofore envisioned. The control strategies detailed herein can be further tailored individually to produce an optimum quality weld in a wide variety of applications. While various displacement measurements have in the past been monitored in an increasing effort to predict and ensure resulting weld quality, none of the traditional methods have involved a system based upon a reversal of electrode displacement to identify and adaptively control weld quality.

The foregoing discussion discloses and describes an exemplary embodiment of the present invention. One skilled in the art will readily recognize from such discussion, and from the accompanying drawings and appended claims, that certain changes, modifications and variations can be made therein without departing from the spirit and scope of the invention as defined in the following claims.

It is claimed:

1. In a resistance welding system wherein a pair of workpieces to be welded are positioned between a first electrode which is movable axially toward and away from a second electrode which remains substantially fixed in position during a weld cycle, wherein an electronic weld controller controls the application of alternating electrical current to at least one said electrode in order to melt a localized area of the material of said workpieces to weld said workpieces to one another, a method of predicting and adaptively controlling weld quality comprising the steps of:

positioning a sensor with respect to said welding system, said sensor being adapted to provide a series of discrete output signals each indicative of the instantaneous displacement of said movable electrode with respect to said fixed electrode;

identifying a reversal wherein said displacement signals cease increasing in magnitude and begin to decrease, said decrease being indicative of indentation of at least one said electrode into the surface of at least one said workpiece; and applying a control signal indicative of said reversal to said electronic controller to cause said controller to adaptively control the application of said current in response thereto, said current being interrupted after a fixed number of half cycles of said alternating current have been applied after a said reversal has been identified.

2. The method of claim 1 wherein said sensor is light based.

3. The method of claim 1 further comprising the step of electrically connecting a processor means between said sensor and said weld controller, said processor means being adapted to process said output signals from said sensor to produce said control signal.

4. The method of claim 3 wherein said processor identifies said reversal by monitoring the slope of an imaginary line between successive output displacement signal values and determining the point at which the slope is substantially equal to zero or changes in sign.

5. The method of claim 3 wherein said processor includes a display device and further including the step of displaying said instantaneous displacements with respect to time.

6. The method of claim 3 further comprising the steps of preselecting a number of weld cycles and modulating said current applied to said controller to obtain a predetermined displacement profile.

7. The method of claim 3 further comprising the step of detecting an expulsion by identifying a sudden sharp decrease in the instantaneous displacement.

8. The method of claim 7 further comprising the step of anticipating an expulsion by detecting an excessive rate of increase in instantaneous displacement values.

9. The method of claim 8 wherein said controller decreases the starting current for a next weld if an expulsion is identified in a previous weld.

10. The method of claim 8 further including the step of decreasing applied current in response to said excessive expansion rate.

11. The method of claim 3 further comprising the step of maintaining weld current after identification of a reversal only until a predetermined amount of displacement indicative of identation is identified.

12. The method of claim 3 further comprising the step of setting certain predefined ranges for said instantaneous displacements and providing a fault indication if a measured displacement falls outside of said predetermined range.

13. The method of claim 12 wherein said predetermined range is defined both in terms of magnitude and time.

14. The method of claim 1 further comprising the step of quantifying a dynamic indentation as the magnitude of displacement occurring subsequent to said reversal and up to the point at which weld current is interrupted and predicting resultant weld quality based on the magnitude of said dynamic indentation.

15. The method of claim 14 further comprising the step of adaptively controlling at least one of the magnitude and duration of said weld current to achieve a predetermined amount of said dynamic indentation.

\* \* \* \* \*